United States Patent [19]

Pacharis et al.

[11] 4,287,807
[45] Sep. 8, 1981

[54] PULL-TO-SET ANCHORING DEVICE

[75] Inventors: George H. Pacharis, Wyomissing; Kunissery P. Sadanandan, Reading, both of Pa.

[73] Assignee: USM Corporation, Farmington, Conn.

[21] Appl. No.: 44,595

[22] Filed: Jun. 1, 1979

[51] Int. Cl.³ .................... F16B 13/04; F16B 33/04
[52] U.S. Cl. ...................... 411/42; 411/55; 411/60; 411/517
[58] Field of Search .............. 85/69, 77, 78, 79, 73, 85/74, 8.8, 64, 67, 71, 72, 76, 80, 75

[56] References Cited

U.S. PATENT DOCUMENTS

| 2,877,681 | 3/1959 | Brown | 85/8.8 |
|---|---|---|---|
| 3,277,770 | 10/1966 | McCulloch | 85/67 |
| 3,448,651 | 6/1969 | Passer | 85/77 |
| 3,524,379 | 8/1970 | Fischer | 85/74 |
| 3,898,907 | 8/1975 | Fischer | 85/64 |
| 3,967,525 | 7/1976 | Lerich | 85/79 |

FOREIGN PATENT DOCUMENTS

| 2744666 | 4/1979 | Fed. Rep. of Germany . |
|---|---|---|
| 579223 | 8/1976 | Switzerland . |
| 1187887 | 4/1970 | United Kingdom . |
| 1434048 | 4/1976 | United Kingdom . |

Primary Examiner—Robert L. Wolfe
Attorney, Agent, or Firm—Owen J. Meegan

[57] ABSTRACT

In a pull-to-set anchoring device for cementatious material in which a nut is disposed upon one end of a stem and a head is formed on the other and a band is disposed on the stem intermediate the head and the nut, the band being arranged to slide into engagement with the cementatious material when the nut is twisted, the improvement including forming a groove on the outer surface of the head and disposing a resilient ring in the groove whereby the band is engaged and expanded to improve the holding characteristics of the device.

6 Claims, 6 Drawing Figures

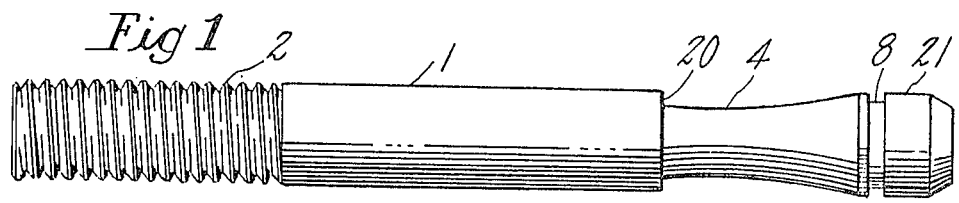
Fig 1
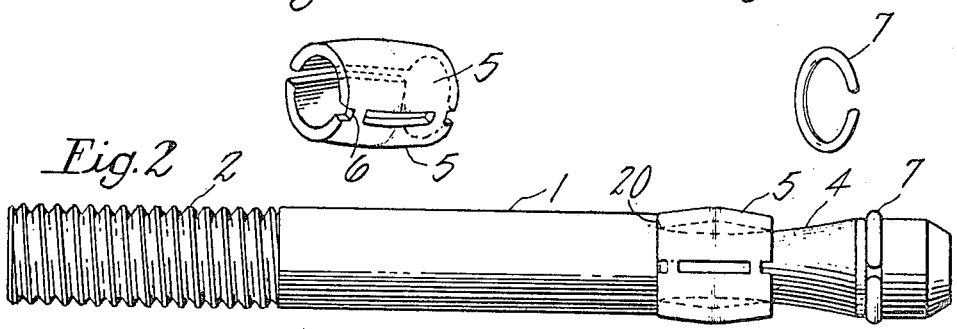
Fig 1A  Fig 1B
Fig 2
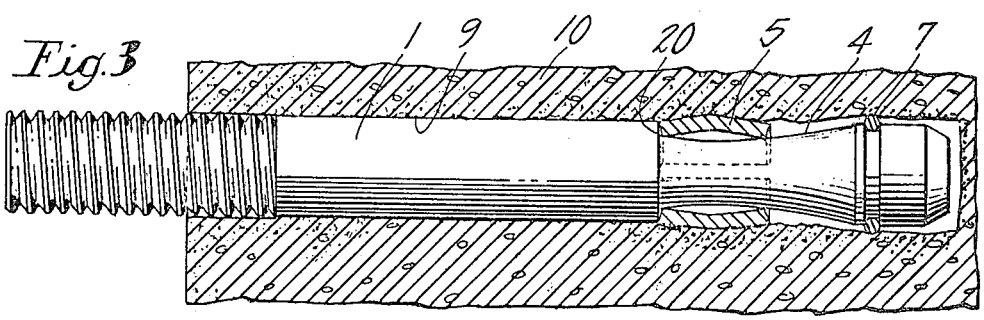
Fig 3
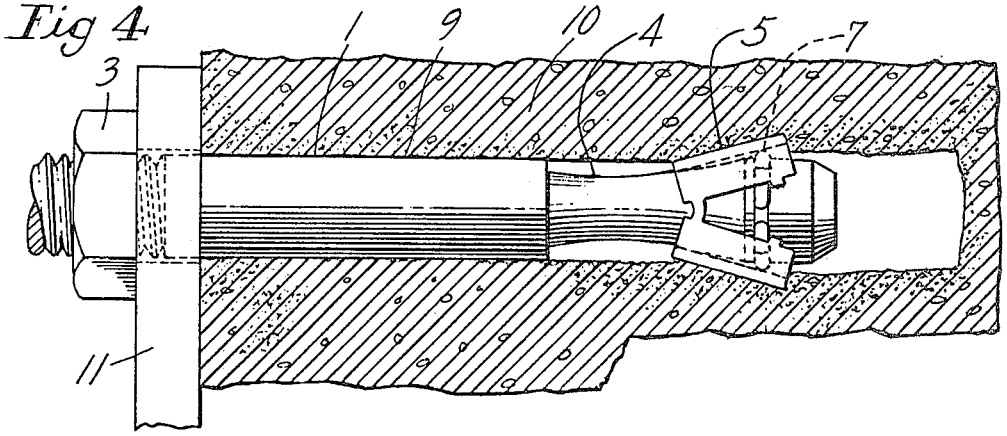
Fig 4

PULL-TO-SET ANCHORING DEVICE

BACKGROUND OF THE INVENTION

The invention relates to anchoring devices and is directed particularly to an expansion bolt assembly which may be expanded to engage the interior of an opening in a wall or like structure to firmly anchor the bolt in place.

DESCRIPTION OF THE PRIOR ART

Expansion bolts are extensively used in the fastener field. One type of bolt includes expansion elements which are mounted on the periphery of a portion of a bolt and lie with in the circumference of the bolt before the bolt is anchored. The expansion elements are urged to a position protruding from the circumference of the bolt during the bolt anchoring operation. In the protruded position, the elements engage the wall of the bore in which the bolt is disposed to insure secure anchoring of the bolt in the bore. Devices of this type are particularly useful in attaching brackets or the like to walls which are otherwise difficult to work with.

Most of the devices of the type described include a plurality of expansion members which are urged out of recesses in the bolt to exert a holding action on particular points within the bore. Generally, the expansion bolts of this type include slide members mounted on wedge shaped or frustroconically shaped portions of the bolt body. While such bolts have performed satisfactorily they have short comings which are overcome by the present invention.

We have found that the expansion mechanism can fail at a load which is far below the strength of the bolt material. One of the more common mechanisms of failure is for the bolt to pull through the wedged member which is disposed on the end. Another failure can occur under conditions in which the bolt is subjected to continual vibration. The wedge member works loose within the concrete in which it is disposed and retightening of the bolts is necessary. The problem with such retightening is that additional threads of the bolt are used and if the retightening has to be repeated from time to time, the bolt may run out of threads. Moreover, such retightening loosens the concrete in which the bolt is embedded and provides less strength for the attachment.

The U.S. Pat. to McCulloch No. 3,277,770 discloses a bolt in which an expandable ring is disposed upon a tapered portion of the stem. Outwardly extending ears flared in a direction opposite to the direction of withdrawal, engage the concrete after insertion in the bore and draw the clip along the tapered stem. Another example of this type of bolt is disclosed in the U.S. Pat. to Passer No. 3,448,651 in which a barrel shaped cylindrical clip is disposed about a concave recess on the shaft of the bolt. In the U.S. Pat. to Lerich No. 3,967,525 a masonary bolt is disclosed which employs expandible wedging members that are positioned in angular grooves along the external surface of the bolt shank. The wedging members are selectively expandable in an outward radial direction into wedging engagement with the wall of the hole in which the bolt is inserted to anchor the bolt in place firmly.

SUMMARY OF THE INVENTION

In accordance with the present invention, we provide a pull-to-set anchor assembly including a fastener body that has an elongated stem with a head at one end and pulling means at the other end. The shaft is provided with shoulder of reduced diameter that forms the beginning of an axially tapering portion (also of reduced diameter) which is disposed intermediate the pulling means and the head. The axially tapering portion has a taper that increases towards the head and terminates as the diameter of the stem is reached. A deformable expansion member, preferably a barrelshaped clip, is disposed about the tapering portion and an abutment means is disposed in a groove that is formed in the head. The abutment means engages the expansion member and limits its motion parallel to the axis of the stem as the pulling means is twisted so as to withdraw the bolt from the concrete. When the abutment means is added, failures in the bolt are slow and only occur at loads which were substantially in excess of those know to the art. The abutment means generally prevents the expansion member from slipping over the bolt and forces the expansion member to be embedded further into the concrete thereby limiting the possibility of failure. The abutment also brings the expansion member up against the concrete to offer strong and continuous resistance which results in a higher load carrying capacity and especially better performance under vibratory conditions.

BRIEF DESCRIPTION OF THE DRAWINGS

FIG. 1 is a side elevational view of the bolt portion of one form of the expansion bolt assembly embodying the invention.

FIGS. 1A and 1B are perspective views of the expansion member and the abutment means, respectively, that can be used with the expansion bolt of FIG. 1.

FIG. 2 is a side elevational view of the bolt with the expansion member and abutment means disposed upon it.

FIG. 3 is a side view, partially in cross-section, of the assembly as disposed in a bore in a body of cementatious material. The bolt has not been pulled to set the expansion member.

FIG. 4 is a side view, partially in cross-section, illustrating the setting of the bolt in concrete and the attachment of a bracket.

DESCRIPTION OF THE PREFERRED EMBODIMENT

Refering to the drawings, the expansion bolt includes a cylindrical bolt member 1 having at one end a threaded portion 2 for receiving a nut 3 or similar pulling device. A tapered expansion portion 4 is disposed at the other end of the bolt and includes a tapered surface that may be defined by a concave arc generated by constant or varying radii. The juncture of the tapered expansion portion 4 and the body of the bolt 1 defines a shoulder 20 against which abuts the expansion member as will be discussed later, in its non-expanded condition. The axial tapering portion 4 increases toward a head 21 and terminates as the diameter of the stem is reached. In the preferred embodiment, groove 8 is disposed in the head 21 adjacent to where the taper 4 reaches the diameter of the head 21. The end of the head 21 is chamfered so as to enable the bolt to be easily driven into a concrete bore.

In FIG. 1A, an expansion member is shown that is adapted to be disposed around the tapered expansion portion of the bolt member. The member is formed of a pair of segments 5 that are arranged to be slidably disposed on the surface of the tapered portion of the bolt. The segments 5 are preferably connected together with connecting means 6 so as to be formed as one integral unit. However, the segments 5 will be referred to in the singular since they can be formed integrally and therefore comprise one expansion member. The expansion member 5 may be fabricated as one unit from sheet metal, such as stainless steel and then rolled around the expansion portion 4 of the bolt. Thus the expansion member 5 is quickly and efficiently mounted upon a bolt without the necessity of applying additional holding mechanisms, such as tape, and without the necessity of aligning lugs and grooves and the like. By means (not shown) well known in the art, the fabrication and rolling of the expansion members onto the bolt can be carried out automatically.

As seen in FIG. 1B, the ring or band 7 which fits into the groove 8 is preferably formed of resilient steel that has been bent into a circular shape with an internal radius approximating the outside diameter of the groove 8 and of an axial width approximately the width of groove 8. This ring 7 will form the abutment means in the assembled bolt. While the ring is shown to be of a circualr cross-section, and that shape is preferred, it is possible to form it of other shapes such as elliptical or square. Similarly, the groove 7 can be of different cross-sections. Also, for ease of manufacturing it is desirable to start with a rod having a diameter equal to the diameter of the bolt member 1 and to machine the threads 2 and expansion portion 4 and groove 8 into this rod. It is also possible to start with a rod of larger diameter and machine the entire surface to form the threads and tapered section and leave an abutment having a diameter larger than the bolt member. In that way, an abutment would be formed integral with the bolt member instead of forming a groove and placing a ring in the groove.

Referring to FIG. 2, the expansion member 5 is shown as disposed upon the expansion portion 4 of the bolt member 1. As shown, it is preferable that the expansion member 5 have a generally barrel shape with the outside diameters of the ends approximating the diameter of the bolt member 1 and the middle having a diameter which is slightly larger than the external diameter of the abutment means 7. The member 5 is preferably free to rotate about the expansion portion 4 but is retained thereon by the shoulder 20 and the tapered expansion portion 4.

In FIG. 3, the expansion anchor is shown disposed within a bore 9 in concrete 10. The nominal diameter of the bore 9 is substantially equivalent to the external diameter of the bolt member 1. But the actual drilled hole diameter is slightly larger and permits the bolt with the ring added, to be inserted into the bore. The central portion of the expansion member 5 is, however, even slightly larger and engages the concrete 10. As clearly indicated in this view, the internal diameter of the ends of the expansion member 5 approximate the external diameter of the tapered portion 4 at the shoulder 20. Also, the ring 7 is only partially inserted within the groove 8 so that at least a portion and generally about half, extends outwardly therefrom, which ring 7 may be caused to be forced into the groove 8 during insertion of the bolt 1 into the bore 9 and which ring 7 may expand its diameter slightly due to its resiliency to further effectuate its abutment characteristics.

In operation and with reference to FIG. 4, the bore 9 is first drilled in a concrete wall or the like 10 to which a bracket or other structure 11 is to be attached. The bolt 1 with expansion member 5 and abutment means 7 assembled thereon is inserted into the bore 9. The bracket 11 is placed on the bolt 1 and then the nut 3 is threaded on. As the nut 3 is tightened, the bolt 1 is pulled from the bore 9. The expansion member 5, however, engages the walls of the bore 9 and tends to remain where it is. As the bolt is pulled further from the bore 9 by the movement of the bolt, the increasing diameter of the tapered portion 4 between the segments of the expansion member 5 causes the segments to move outwardly. The ring 7 forces the expansion member further outward into the side of the bore 9 against increasing resistance offered by the concrete. The higher pressures formed, the deeper embedment into the side of the bore and the larger diameter of the ring reduces the possibility of movement of the expansion member 5 under load and any tendancy of the tapered portion 4 from slipping through the expansion member 5. The bolt is thus securely fixed into position in the bore 9 and bracket 11 is securely fixed to the wall 10.

It has been found that the bolt assembly of the present invention has greatly increased the holding power, up to about 50 percent in tests, over a like assembly without the addition of the ring 7 and that the expansion bolt performs better under vibratory conditions than other similar bolts.

The following table illustrates the advantages of the ring expansion bolt when compared to one without a ring. As can be seen, the holding power of the ringed expansion anchor is substantially increased in all cases.

| COMPARISON RINGED EXPANSION ANCHOR VS. REGULAR EXPANSION ANCHOR | |
|---|---|
| Anchor size ½" × 5¼" | |
| Concrete strength = 4000 PSI | |
| Readings on GF813 S Enerpac gage while using tensionaire cylinder under identical conditions | |
| REGULAR EXPANSION ANCHOR | RINGED EXPANSION ANCHOR |
| 9 | 10½ |
| 5 | 9½ |
| 9½ | 11 |
| 10½ | 11 |
| 10½ | 12 |

It is apparent the modifications and changes can be made within the spirit and scope of the present invention. It is our intension, however, only to be limited by the scope of the appended claims.

As our invention we claim:

1. In a pull-to-set anchor assembly comprising a fastener body having an elongate stem with a head at one end and pulling means at the other end and a reduced axially tapering portion of the stem disposed intermediate of the pulling means and the head, said axially tapering portion having the taper increasing toward the head and terminating as the diameter of the stem is reached and further including a deformable retaining means that is disposed about the tapering portion, said retaining means being greater than the diameter of the stem, said retaining means being arranged to engage an external surface and deform upon actuation of said pulling means wherein an abutment means disposed on the head is arranged to engage and expand the retaining means and limit motion of the stem along the longitudinal axis of the stem, said abutment means comprising an expandable annular member of diameter greater than the diameter of the stem which causes said retaining means to expand.

2. The anchor assembly according to claim 1, wherein a peripheral groove is disposed upon the head and the abutment is disposed within said groove.

3. The anchor assembly according to claim 2, wherein the abutment means is a ring that is partially seated within said groove and arranged to engage one end of the retaining means upon application of a pulling force to the stem.

4. A pull-to-set anchor assembly comprising a fastener body having an elongated stem with a head at one end said head having a diameter not substantially less than the stem and a reduced axially tapered portion of the stem merging with the head, a member slidably mounted on said portion for radial expansion thereby and a resilient band initially retained on said head and having an outer circumference larger than that of the head, the arrangement being such that upon axial movement of the stem relative to the member when the assembly has been inserted head first in a bore of substantially the same outer diameter as the band, the member is circumferentially enlarged for engagement with the wall of the bore and the band is engageable with the member endwise to limit the relative movement of the stem and member and augment holding capability of the assembly with said wall.

5. An anchor assembly according to claim 4 wherein the band is a split ring of metal initally receivable, at least in part, in a groove circumferentially formed in said head.

6. An anchor assembly as in claim 5, wherein the ring is a wire of circular cross-section and said groove is of a depth approximately equal to about half the diameter of the wire, the axial width of the groove corresponding substantially to the diameter of the wire, said wire substantially occupying more than one half of the groove circumferentially.

* * * * *